(12) United States Patent  (10) Patent No.: US 9,103,935 B2
Mousa et al.  (45) Date of Patent: Aug. 11, 2015

(54) METHOD OF FIRST ARRIVAL PICKING OF SEISMIC REFRACTION DATA

(71) Applicant: KING FAHD UNIVERSITY OF PETROLEUM AND MINERALS, Dhahran (SA)

(72) Inventors: Wail Mousa, Dhahran (SA); Abdullatif Abdulrahman Al-Shuhail, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 370 days.

(21) Appl. No.: 13/758,945

(22) Filed: Feb. 4, 2013

(65) Prior Publication Data

US 2014/0219054 A1    Aug. 7, 2014

(51) Int. Cl.
*G01V 1/38*    (2006.01)
*G01V 1/36*    (2006.01)

(52) U.S. Cl.
CPC ..................... *G01V 1/364* (2013.01)

(58) Field of Classification Search
USPC ....................................... 367/36, 43
See application file for complete search history.

(56) References Cited

U.S. PATENT DOCUMENTS

| | | | |
|---|---|---|---|
| 4,760,563 A | 7/1988 | Beylkin | |
| 5,648,938 A | 7/1997 | Jakubowicz | |
| 6,735,528 B2 | 5/2004 | Wood et al. | |
| 6,987,706 B2* | 1/2006 | Wood | 367/43 |
| 7,366,054 B1 | 4/2008 | Wood | |
| 7,639,564 B2 | 12/2009 | Paffenholz et al. | |
| 8,209,126 B2 | 6/2012 | Berkovitch et al. | |
| 8,223,587 B2* | 7/2012 | Krebs et al. | 367/43 |
| 2004/0049348 A1* | 3/2004 | Wood | 702/17 |
| 2009/0135670 A1* | 5/2009 | Deffenbaugh et al. | 367/43 |
| 2009/0180351 A1* | 7/2009 | Paffenholz et al. | 367/38 |
| 2009/0248313 A1* | 10/2009 | Berkovitch et al. | 702/16 |
| 2010/0074051 A1* | 3/2010 | Halliday et al. | 367/43 |
| 2011/0069581 A1* | 3/2011 | Krohn | 367/43 |
| 2011/0096626 A1 | 4/2011 | Zhu et al. | |
| 2011/0141848 A1 | 6/2011 | Beasley et al. | |
| 2011/0238390 A1* | 9/2011 | Krebs et al. | 703/2 |
| 2012/0026829 A1 | 2/2012 | Hegna | |
| 2013/0182533 A1* | 7/2013 | Rentsch-Smith | 367/24 |
| 2014/0036060 A1* | 2/2014 | Claussen et al. | 348/85 |

* cited by examiner

*Primary Examiner* — James Hulka
(74) *Attorney, Agent, or Firm* — Richard C Litman

(57) ABSTRACT

The method of first arrival picking of seismic refraction data is embodied in software that uses the τ-p transform on energy-ratio seismic records. First, the seismic shots are gathered. Next, the energy ratio (ER) is computed, and then the τ-p transform of the energy ratio is computed. Using a binary mask, a corresponding first arrival energy is selected. The transform is combined with the binary mask and presented as input to an inverse τ-p transform. The inverse transform data is then thresholded, and indices of ER first arrivals are detected based on the thresholds. The software then creates a vector of indices or time samples of picks. This method can be used to better guide the subsequent careful picking of first arrivals. Moreover, the method automatically interpolates missing picks.

6 Claims, 4 Drawing Sheets

METHOD OF FIRST ARRIVAL PICKING OF SEISMIC REFRACTION DATA

BACKGROUND OF THE INVENTION

1. Field of the Invention

The present invention relates to the analysis of seismic data, and particularly to a method of first arrival picking of seismic refraction data using the τ-p transform on energy ratio seismic shot records to enhance the determination of first arrival events.

2. Description of the Related Art

In the oil and gas industry, seismic surveys are one of the most important techniques for discovering the presence of subterranean hydrocarbon deposits. If the data is properly processed and interpreted, a seismic survey can provide geologists with a two-dimensional (2-D) or three-dimensional (3-D) representation of subsurface lithologic formations and other features, so that they may better identify those formations likely to contain oil and/or gas. Having an accurate representation of an area's subsurface lithologic formations can increase the odds of hitting an economically recoverable reservoir when drilling, and decrease the odds of wasting money and effort on a nonproductive well.

Oil and gas are often trapped thousands of feet below the earth's surface. To find the oil, geologists and geophysicists typically use either two-dimensional (2D) or three-dimensional (3D) seismic surveys. To perform these seismic surveys, an acoustic wave generated by a shot, e.g., dynamite or a mechanical vibrator, is propagated downward and is refracted back when it encounters a geological discontinuity. This signal is recorded by a geophone as a trace.

To gather high-fold surveys, land seismic survey operations typically require placing hundreds to thousands of geophones at locations about the area to be surveyed. When a seismic source is generated, either as an impulse caused by dynamite or a vibration sweep caused by a mechanical apparatus carried by a truck, the seismic reflections are detected by the geophones. The seismic data generated by all the geophones is then transmitted to a central recording system.

The amount of seismic data transmitted to the central recording system may be considerable. For example, a 20-second vibration sweep can generate on the order of 250,000 bits of data. When there are 1,000 geophone channels in use, this translates to 250,000,000 bits of data every 20 seconds, or an effective data rate of 12.5 megabits per second. Increasing the number of geophone channels increases the amount of seismic data to be transferred to the central recording system. Many current seismic survey projects have more than 10,000 geophones active at any one time, and the requirements for more channels are increasing. In a few years time, it is expected that channel counts as high as 100,000 will not be uncommon. These data rates put tremendous strain on traditionally used seismic data processing techniques.

Once the high-fold surveys are taken, the seismic data processing of all the collected seismic data begins. One of the processing steps is determining the "first arrival" or "first break" for each of the traces. The first arrival indicates a refraction of the acoustic energy upon encountering a geological discontinuity, and the timing of the first arrival, or first arrival time, is important in determining the depth of the refractor and performing corrections to a stack of seismic traces. Historically, a geophysicist would manually pick the first arrival for each trace of a seismic stack. This process was time-consuming, and several auto-picking methods emerged, including those using energy ratios, fractals, and neural networks to automatically determine the first arrivals.

Unfortunately, these auto-picking methods are not particularly adapted for use with 3D surveys. For 3D surveys, interactive first arrival picking is common. Using this method, an interpreter sits at a workstation, displays shot gathers, and uses an auto-picker to select first arrivals. Quality control is achieved by interactive editing in the shot, receiver, and offset domains. This process can take months for large 3D surveys having high channel counts and consisting of millions of traces.

The data in a gather is typically recorded or first assembled in the time-offset domain. That is, the seismic traces recorded in the gather are assembled or displayed together as a function of offset (i.e., the distance of the receiver from a reference point) and of time. The time required for a given signal to reach and be detected by successive receivers is a function of its velocity and the distance traveled. Those functions are referred to as kinematic travel time trajectories. Thus, at least in theory, when the gathered data is displayed in the time-offset domain (the (t-x) domain), the amplitude peaks corresponding to reflection signals detected at the receivers should align into patterns that mirror the kinematic travel time trajectories. It is from those trajectories that one ultimately may determine an estimate of the depths at which formations exist.

To achieve this determination, there exist many methods that seek to achieve a separation of the refracted first-arrival signal from noise by transforming the data from the (t-x) domain to other domains, such as the frequency-wavenumber (F-K) or the time-slowness (tau-P) domains, in order to minimize overlap between the signal and noise data. Once the data is transformed, various mathematical filters are employed to the transformed data to eliminate as much of the noise as possible in an effort to enhance the primary reflection signals. The data is then inverse-transformed back into the (t-x) domain for interpretation or further processing. For example, so-called Radon filters are commonly used to attenuate or remove multiple reflection signals. Such methods rely on Radon transformation equations to transform data from the (t-x) domain to the τ-p domain, where it can be filtered. More specifically, the (t-x) data is transformed along kinematic travel time trajectories having constant velocities and slowness, where slowness p is defined as the reciprocal of velocity ($p=1/v$). While various mathematical methods have been developed to process seismic data in such a way that noise is separated from primary reflection signals, there remains a problem with τ-p interpolation due to the presence of noise.

Thus, a method of first arrival picking of seismic refraction data solving the aforementioned problems is desired.

SUMMARY OF THE INVENTION

The method of first arrival picking of seismic refraction data is embodied in software that uses the τ-p transform on energy ratio seismic records. First, the seismic shots are gathered. Next, the energy ratio (ER) is computed, and then the τ-p transform of the energy ratio is computed. Using a binary mask, a corresponding first arrival energy is selected. The transform is combined with the binary mask and presented as input to an inverse τ-p transform. The inverse transform data is then thresholded, and indices of ER first arrivals are detected based on the thresholds. The software then creates a vector of indices or time samples of picks. This method can be used to better guide the subsequent careful picking of first arrivals. Moreover, the method automatically interpolates missing picks.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
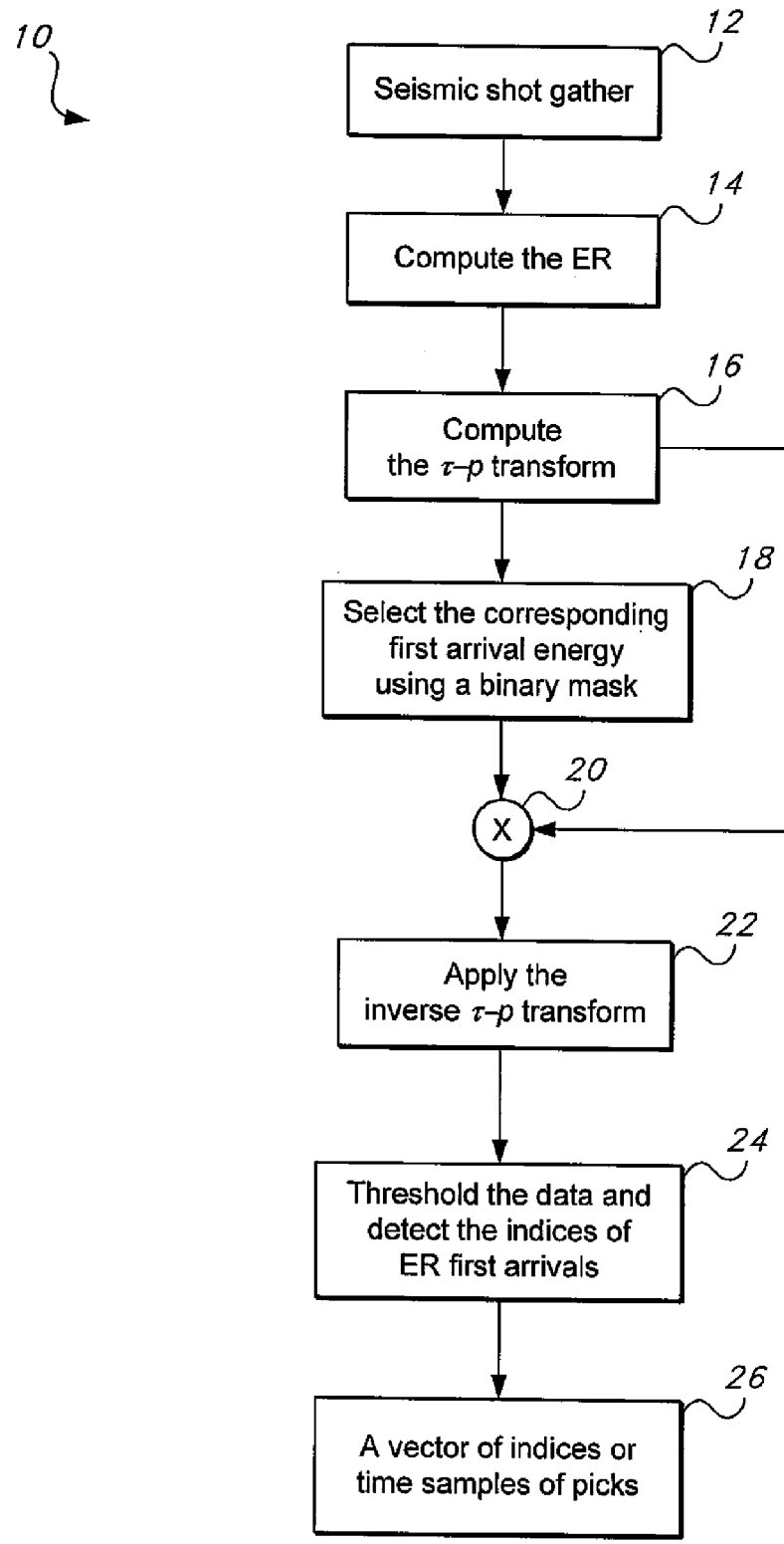
FIG. 1 is a flowchart showing the steps of a method of first arrival picking of seismic refraction data according to the present invention.

The method of first arrival picking of seismic refraction data is embodied in software that uses the $\tau$-p transform on energy ratio seismic records. As shown in FIG. 1, the method 10 first gathers the seismic shots at step 12. At step 14, the energy ratio (ER) is computed according to the relation known in the art as the Coppens' Method:

$$ER_j = \frac{\sum_{i=j}^{i=j+L} A_i^2}{\sum_{i=1}^{i=j+L} A_i^2} \tag{1}$$

where $ER_j$ is the energy ratio value associated with the window starting with the $j^{th}$ sample of the trace, and $A_i$ is the signal amplitude of the $i^{th}$ sample of the trace. The energy ratio tends to emphasize the first few samples of the record, which basically consists of noise. This energy ratio peak can be recognized easily by its position at the very top of the trace, and therefore can be neglected. The second energy ratio peak is always associated with the first arrival, which includes direct and critically refracted waves that are of interest to exploration seismology. However, these two peaks can possibly interfere on near offset traces due to their proximity, which might limit the performance of any first-break picking method on these traces. Therefore, we expect the method to perform better for medium-to-large offset traces, where the two peaks are completely separated on the energy ratio seismic record.

It should be understood that the energy ratio peak corresponding to the first arrival usually starts L−1 samples before the actual first arrival, due to the high amplitude of the first arrival compared to the preceding noise. Therefore, knowing the window length, which is set forth by the user, shift the onset of the energy-ratio peak by L−1 samples forward to precisely locate the first sample of the first arrival.

The window length, L, should be selected as small as possible to avoid mixing closely spaced events. However, some testing might be required to determine the appropriate window length for each data set (especially for noisy data sets) because shorter window lengths might boost noise spikes. Setting the window length equal to the dominant period of the first arrival is usually a good compromise.

Returning to FIG. 1, at step 16 the $\tau$-p transform of the calculated energy ratio is computed. The $\tau$-p transform is also called the slant-stack transform. It maps linear events in the time-offset (t-x) domain to points in the $\tau$-p domain, where $\tau$ stands for the intercept time (at x=0) and p=1/v is the slowness of the linear event. The time-offset domain is an assembly of the shot record, which is a function of offset (i.e., the distance of the receiver from a reference point) and of time. The transform finds the best-fit line to the linear event by scanning through all possible values of $\tau$ and p. The method has been used in many applications, including velocity filtering and multiple suppression. One example of a $\tau$-p transform is described in U.S. Pat. No. 6,735,528, issued to Wood et al. on May 11, 2004, which is hereby incorporated by reference in its entirety. As described in the Wood et al. patent, the $\tau$-p transform is a special case of the Radon transform, which may be characterized by the relation:

$$u(p,\tau) = \int_{-\infty}^{+\infty} u(x, \tau+px) dx \tag{2}$$

where $u(p, \tau)$ is the transform coefficient at slowness p and zero-offset time t=two way travel time, x=offset, and $\tau$=two-way intercept time at p=0.

The linear inverse $\tau$-p transform is characterized by the relation:

$$u(x,t) = \int_{-\infty}^{+\infty} p(\tau) * u(p, t-px) dp \tag{3}$$

A further example of the use of the $\tau$-p transform and the inverse $\tau$-p transform to enhance seismic signal properties is described in U.S. Pat. No. 4,760,563, issued to Beylkin on Jul. 26, 1988, which is hereby incorporated by reference in its entirety. Unlike the aforementioned Wood et al. and Beylkin patents, the present method utilizes the energy ratio computation of equation (1) as input to the $\tau$-p transform operation for processing in the time-slowness domain to enhance the energy ratio signal.

At step 18, a binary mask is generated (where one is given for the required first-arrival picks region with the $\tau$-p energy ratio map and zero for otherwise) to facilitate selection of a corresponding first arrival energy. At step 20, the transform is multiplied with the binary mask, the product being presented as input to an inverse $\tau$-p transform, which is applied at step 22. At step 24, the inverse transform data is binary hard thresholded to convert the result into a binary image, which facilitates the detection of ER first arrival indices, i.e., the indices of the upper edge of the appearing mask for the first-break area are obtained. For example, the MATLAB function called im2bi.m can accomplish this binary hard thresholding task.

These indices are shifted down by an amount equal to L−1, where L is the window length used to calculate the energy ratio record. Then, at step 26, the software forms a vector made of the indices or time samples of picks. This method can be used to better guide the subsequent careful picking of first arrivals. Moreover, the method automatically interpolates missing picks.

The present method is applied to Shot gather 6 (shown in FIGS. 2A-2F), which consists of 48 traces with dt=4 ms and dx=100 m for a dynamite source, taken from a site located in the Far East. We used L=32 samples. FIG. 2F shows the τ-p energy ratio picks, along with the interpolated manual picks by an expert geophysicist, as well as the picks from using a combination of cross-correlation with the Coppens' method (called here the mix Coppens' method). By the mix Coppens' method, we mean using cross-correlation on the energy ratios produced by the Coppens' method. The idea is to make the picking automatic by searching for the maximum cross-correlation of adjacent energy ratio traces. For the dynamite shot gather in FIG. 2A, the instant method outperformed the mix Coppens' method.

Figure 2A:
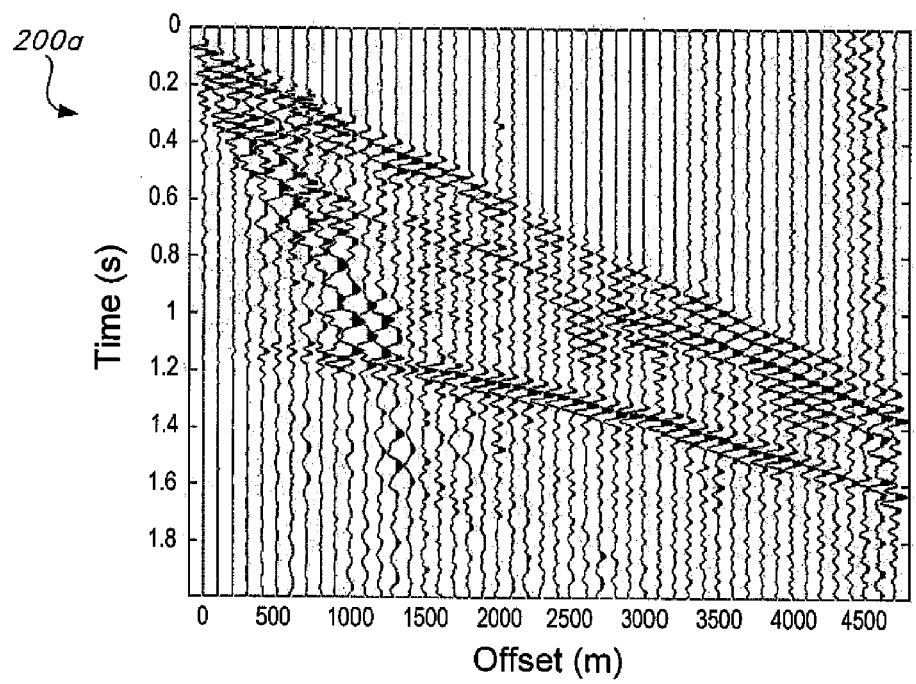
FIG. 2A is an exemplary plot of a shot record operated on by the method of first arrival picking of seismic refraction data according to the present invention.
Figure 2B:
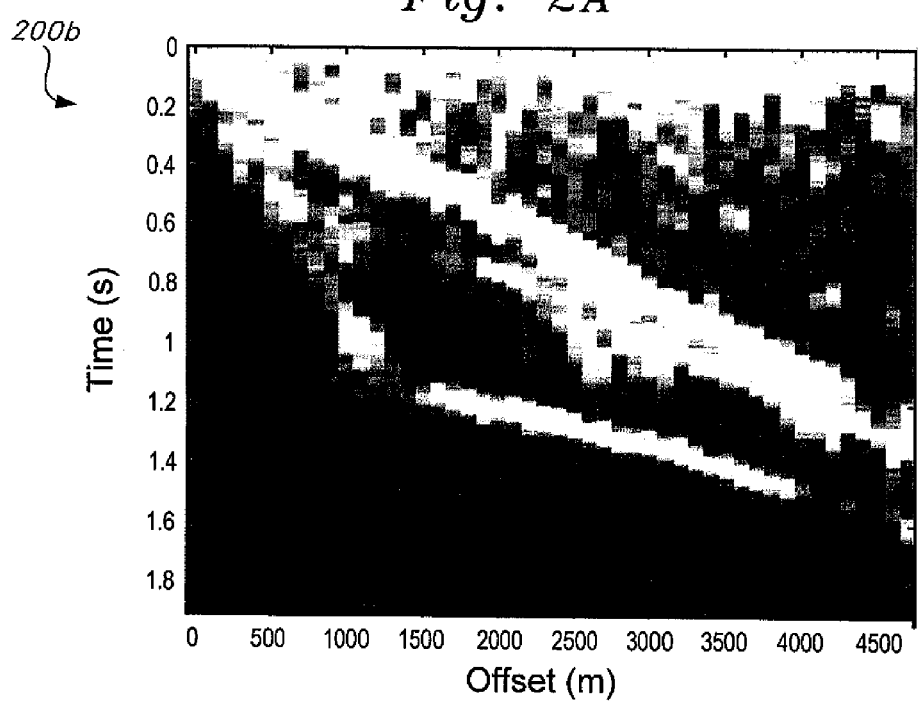
FIG. 2B is an exemplary plot of a generated energy ratio used by the method of first arrival picking of seismic refraction data according to the present invention.
Figure 2C:
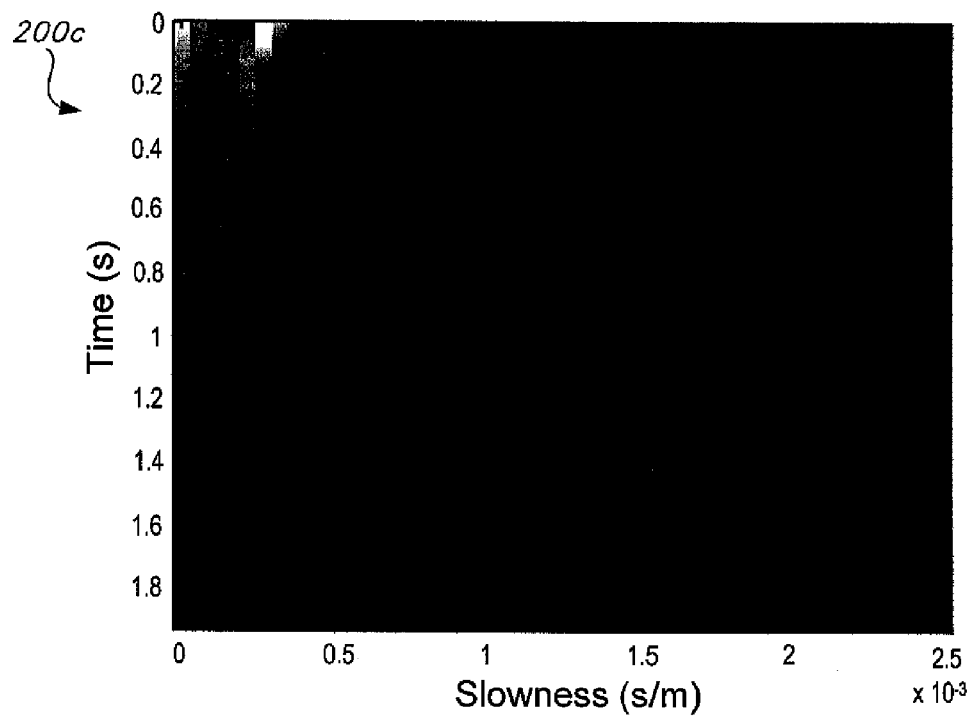
FIG. 2C is a time vs. slowness chart showing a $\tau$-p transform using the exemplary dataset of FIG. 2A.
Figure 2D:
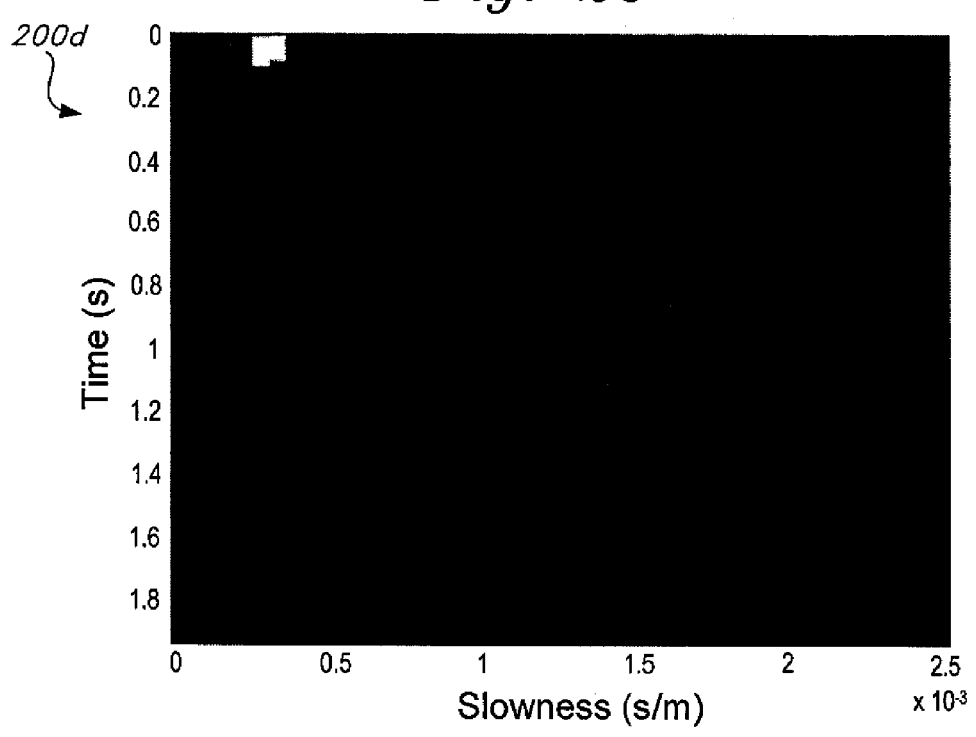
FIG. 2D is a time vs. slowness chart showing the resulting binary mask from the transform of FIG. 2C.
Figure 2E:
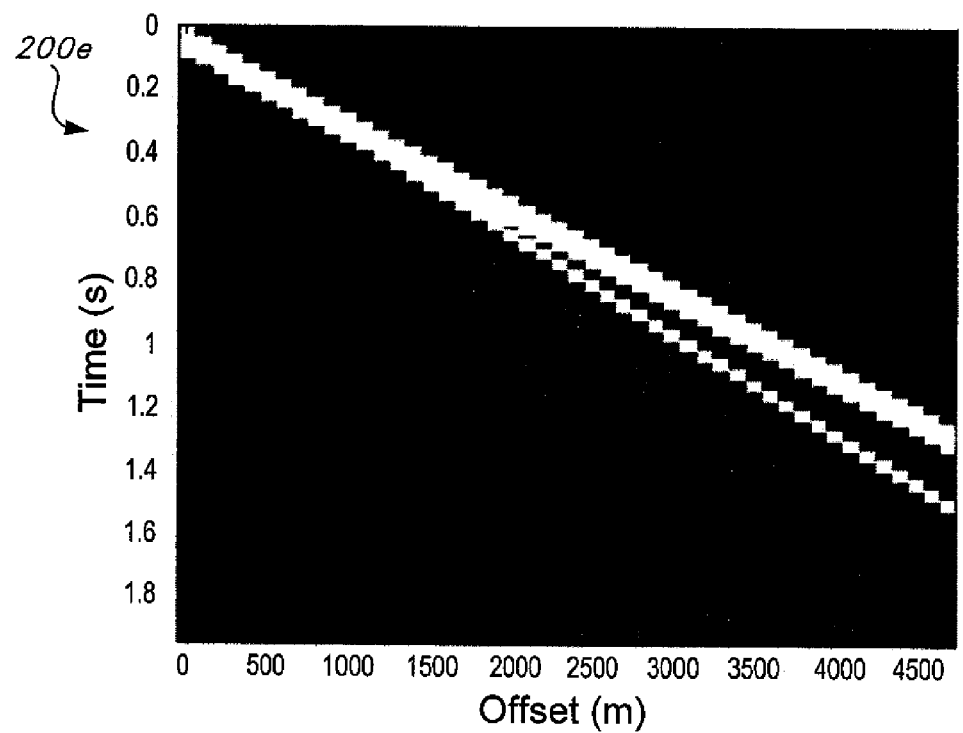
FIG. 2E is a time vs. offset chart showing the binary image of the inverse transform.
Figure 2F:
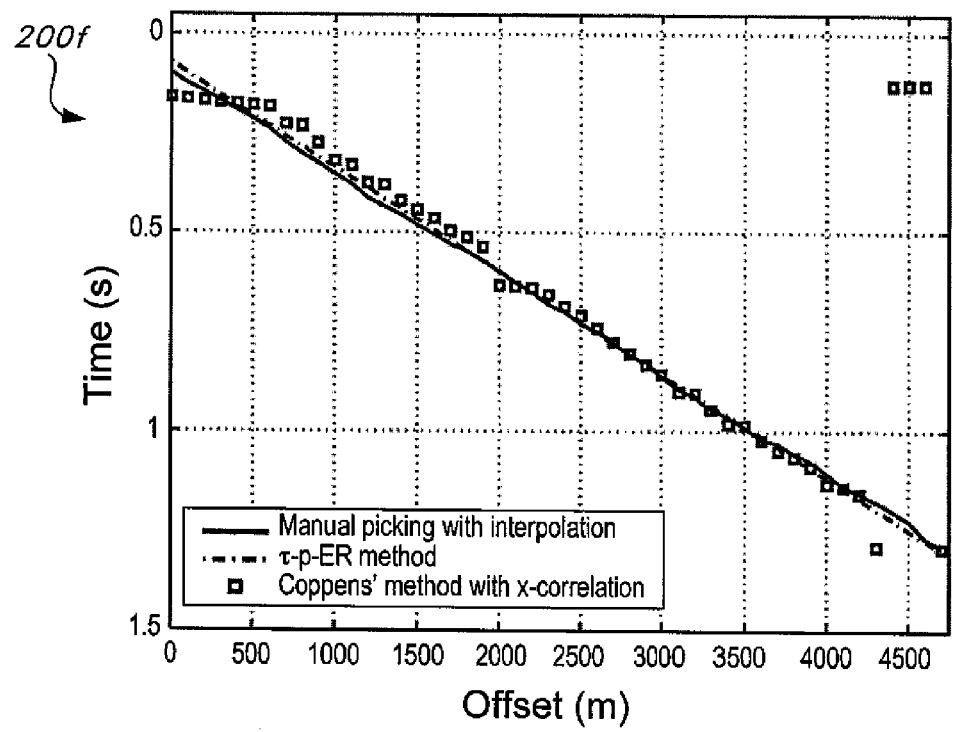
FIG. 2F is a comparison plot showing first arrival picks for the data of FIG. 2A by known methods vs. the method of first arrival picking of seismic refraction data according to the present invention.

FIG. 2A shows a plot 200a of shot record number 6 from Yilmaz ("Seismic data analysis: Processing, inversion, and interpretation of seismic data", 2nd ed. [O. Yilmaz, ed.], 2001). FIG. 2B shows a plot 200b, which is the generated energy ratio with a window length of 32 samples. FIG. 2C shows a plot 200c, which is the τ-p transform of the data shown in plot 200b. FIG. 2D shows plot 200d, which is the produced binary mask (white stands for one and black for zero) for the user-selected region of first arrivals of the data shown in plot 200c. FIG. 2E shows plot 200e, which is the binary image of the inverse τ-p transform of the selected first-arrival region that is based on the mask shown in plot 200d. FIG. 2F shows plot 200f, which is the first-arrival picks of the shot record of plot 200a based on manual picking with interpolation, the mix-Coppens' method, and the present method.

It should be understood by one of ordinary skill in the art that embodiments of the present method can comprise software or firmware code executing on a computer, a microcontroller, a microprocessor, or a DSP processor; state machines implemented in application specific or programmable logic; or numerous other forms. The present method can be provided as a computer program, which includes a non-transitory machine-readable medium having stored thereon instructions that can be used to program a computer (or other electronic devices) to perform a process according to the method. The machine-readable medium can include, but is not limited to, floppy diskettes, optical disks, CD-ROMs, and magneto-optical disks, ROMs, RAMs, EPROMs, EEPROMs, magnetic or optical cards, flash memory, or other type of media or machine-readable medium suitable for storing electronic instructions.

It is to be understood that the present invention is not limited to the embodiments described above, but encompasses any and all embodiments within the scope of the following claims.

We claim:

1. A method of first arrival picking of seismic refraction data, comprising the steps of:
    obtaining field records of seismic data detected at a plurality of seismic receivers in an area of interest, the seismic data including signal amplitude data recorded over time and containing both first arrival reflection signals and unwanted noise;
    calculating the signal amplitude data in an offset-time domain, the signal amplitude data being formulated as energy ratio amplitude data characterized by the relation:

$$ER_j = \frac{\sum_{i=j}^{i=j+L} A_i^2}{\sum_{i=1}^{i=j+L} A_i^2}$$

where $ER_j$ is the energy-ratio value associated with a sampling window starting with the $j^{th}$ sample of a trace of the energy ratio amplitude data and $A_i$ is the signal amplitude of the $i^{th}$ sample of the trace;

applying a Radon transform to the energy ratio amplitude data, thereby transforming the energy ratio amplitude data from the offset-time domain to a time-slowness domain;
    selecting a corresponding first arrival energy data from the time-slowness domain energy ratio amplitude data, the selection generating a binary mask wherein a binary 1 indicates a required first-arrival picks region with a τ-p energy ratio map and a binary 0 indicates that the region is not a required first-arrival picks region;
    multiplying the Radon transformed energy ratio amplitude data with the binary mask to form a Radon transform energy ratio amplitude data-binary mask product;
    applying an inverse Radon transform to the Radon transform energy ratio amplitude data-binary mask product, thereby transforming the Radon transform energy ratio amplitude data-binary mask product into the offset-time domain; and
    binary thresholding in the offset-time domain the inverse Radon transform of the product, thereby producing an enhanced binary image in the offset-time domain of the selected first arrival region.

2. The method of first arrival picking of seismic refraction data according to claim 1, further comprising the step of obtaining indices of an upper edge of said mask for the first arrival picks region.

3. The method of first arrival picking of seismic refraction data according to claim 2, further comprising the step of shifting said indices down by an amount equal to L−1, where L is a window length used to calculate said energy-ratio amplitude data.

4. A computer software product, comprising a medium readable by a processor, the medium having stored thereon a set of instructions for first arrival picking of seismic refraction data, the set of instructions including:
    (a) a first sequence of instructions which, when executed by the processor, causes said processor to obtain field records of seismic data detected at a plurality of seismic receivers in an area of interest, the seismic data including signal amplitude data recorded over time and containing both first arrival reflection signals and unwanted noise;
    (b) a second sequence of instructions which, when executed by the processor, causes said processor to calculate said signal amplitude data in an offset-time domain, said signal amplitude data being formulated as energy ratio amplitude data characterized by the relation:

$$ER_j = \frac{\sum_{i=j}^{i=j+L} A_i^2}{\sum_{i=1}^{i=j+L} A_i^2}$$

where $ER_j$ is the energy-ratio value associated with a sampling window starting with the $j^{th}$ sample of a trace of the energy ratio amplitude data and $A_i$ is the signal amplitude of the $i^{th}$ sample of the trace;

(c) a third sequence of instructions which, when executed by the processor, causes said processor to apply a Radon transform to the energy ratio amplitude data, thereby transforming the energy ratio amplitude data from the offset-time domain to a time-slowness domain;

(d) a fourth sequence of instructions which, when executed by the processor, causes said processor to select a corresponding first arrival energy data from the time-slowness domain energy ratio amplitude data, the selection generating a binary mask wherein a binary 1 indicates a required first-arrival picks region with a τ-p energy ratio map and a binary 0 indicates that the region is not a required first-arrival picks region;

(e) a fifth sequence of instructions which, when executed by the processor, causes said processor to multiply the Radon transformed energy ratio amplitude data with the binary mask to form a Radon transform energy ratio amplitude data-binary mask product;

(f) a sixth sequence of instructions which, when executed by the processor, causes said processor to apply an inverse Radon transform to the product, thereby transforming the Radon transform energy ratio amplitude data-binary mask product into said offset-time domain; and (g) a seventh sequence of instructions which, when executed by the processor, causes said processor to binary threshold in the offset-time domain the inverse Radon transform of the product, thereby producing an enhanced binary image in the offset-time domain of the selected first arrival region.

5. The computer software product according to claim 4, further comprising an eighth sequence of instructions which, when executed by the processor, causes said processor to obtain indices of an upper edge of said mask for the first arrival picks region.

6. The computer software product according to claim 5, further comprising a ninth sequence of instructions which, when executed by the processor, causes said processor to shift said indices down by an amount equal to L−1, where L is a window length used to calculate the energy ratio amplitude data.

\* \* \* \* \*